United States Patent
Condon et al.

(10) Patent No.: US 10,146,486 B2
(45) Date of Patent: Dec. 4, 2018

(54) PRESERVING LOGICAL PAGE ORDER IN A PRINT JOB

(71) Applicants: John Barker Condon, Corvallis, OR (US); Reinhard Heinrich Hohensee, Boulder, CO (US); Harry Reese Lewis, Longmont, CO (US)

(72) Inventors: John Barker Condon, Corvallis, OR (US); Reinhard Heinrich Hohensee, Boulder, CO (US); Harry Reese Lewis, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 114 days.

(21) Appl. No.: 15/390,968

(22) Filed: Dec. 27, 2016

(65) Prior Publication Data
US 2018/0181349 A1    Jun. 28, 2018

(51) Int. Cl.
*G06F 3/12* (2006.01)

(52) U.S. Cl.
CPC .............. *G06F 3/121* (2013.01); *G06F 3/125* (2013.01); *G06F 3/1208* (2013.01); *G06F 3/1222* (2013.01); *G06F 3/1248* (2013.01); *G06F 3/1256* (2013.01); *G06F 3/1275* (2013.01)

(58) Field of Classification Search
None
See application file for complete search history.

(56) References Cited

U.S. PATENT DOCUMENTS

| | | |
|---|---|---|
| 7,675,636 B2 | 3/2010 | Yamashita |
| 8,049,917 B2 | 11/2011 | Noguchi et al. |
| 8,456,696 B2 | 6/2013 | Jeong et al. |
| 2008/0174790 A1 | 7/2008 | Noguchi et al. |
| 2012/0069399 A1 | 3/2012 | Shibasaki |
| 2013/0050748 A1 | 2/2013 | Tsuchitoi |

*Primary Examiner* — Paul F Payer
(74) *Attorney, Agent, or Firm* — Duft & Bornsen, PC

(57) ABSTRACT

Systems and methods for preserving logical page order in a print job. One embodiment is a system that includes an interface that receives a print job having documents, and a controller that identifies different groups of logical pages belonging to different documents. The controller inserts an identifier into each logical page of the different groups that distinguishes logical pages of different documents, and directs the print job into a print workflow that comprises an ordered set of activities to perform upon the documents. The controller also obtains layout information that indicates a placement of one or more logical pages on a sheet, retrieves identifiers from each of the one or more logical pages of the sheet, and detects a print error based on a difference in the identifiers retrieved for the sheet.

20 Claims, 6 Drawing Sheets

PRESERVING LOGICAL PAGE ORDER IN A PRINT JOB

FIELD OF THE INVENTION

The invention relates to the field of printing systems, and in particular, to print jobs.

BACKGROUND

Print shops are typically medium or large scale facilities capable of supplying printing services for large institutions. For example, a print shop may be used by a bank or hospital to print documents for mass-mailing, such as bills, credit card statements, insurance reports, etc. A print shop may therefore handle large print jobs containing hundreds or thousands of documents, and each document may include one or more pages with private or sensitive information which is intended for delivery to a particular customer.

The print shop may include a centralized server that coordinates activity of a number of high-volume printers as well as other devices that prepare the documents for printing and delivery. The server may process print data in an encoded stream (e.g., Page Description Language (PDL)) where the format of each page is described in a sequential order and the data for each page includes the resources, or references to the resources, used to print the data for that page. Print data structured in this manner is useful for high-speed printing because it enables a printer to begin printing as soon as it receives data for the first page and continue printing page-by-page without first processing data located at the end of the print data stream.

Occasionally, one of the preparation activities managed by the server may inadvertently add or remove a page from the print job prior to printing. For example, a pre-flight activity may sometimes insert/delete an object from print data that describes a logical page. This can be problematic because, while the the format of print data used in a print shop is useful for high-speed printing, it does not provide a structure for mapping logical pages to a particular document or sheetside after the print job has been created. Thus, the inadvertently inserted/removed pages may shift in the print job and cause the print engine to produce a document that includes a page which is intended for a different document/customer. As a result, the wrong page or customer information may be printed and mailed to a customer, leading to print waste and potentially fines and privacy violations such as Health Insurance Portability and Accountability Act (HIPAA) violations.

SUMMARY

Embodiments described herein use metadata to preserve the logical page order in a print job. The documents of a print job may be unintentionally modified during pre-flight or other workflow activities after the print job has already been generated. To prevent the modification from shifting the printed output, each logical page may be tagged with metadata that describes its relationship to a document and whether it is expected to be on a front side of a sheet or a back side of a sheet. Since the metadata is self-identifying for a logical page, it may be used to detect instances in which a modification has shifted the document/page relationship in the print job.

One embodiment is a system that includes an interface that receives a print job that defines documents for an intended recipient for delivery, and a controller. The controller identifies different groups of logical pages in the print job that belong to different documents, inserts an identifier into each logical page of the different groups that distinguishes logical pages of different documents, and directs the print job into a print workflow that comprises an ordered set of activities to perform upon the documents. The controller also obtains layout information that indicates a placement of one or more logical pages on a sheet, retrieves identifiers from each of the one or more logical pages of the sheet, and detects a print error in response to a determination that at least one of the identifiers retrieved for the sheet is different than another one of the identifiers retrieved for the sheet.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
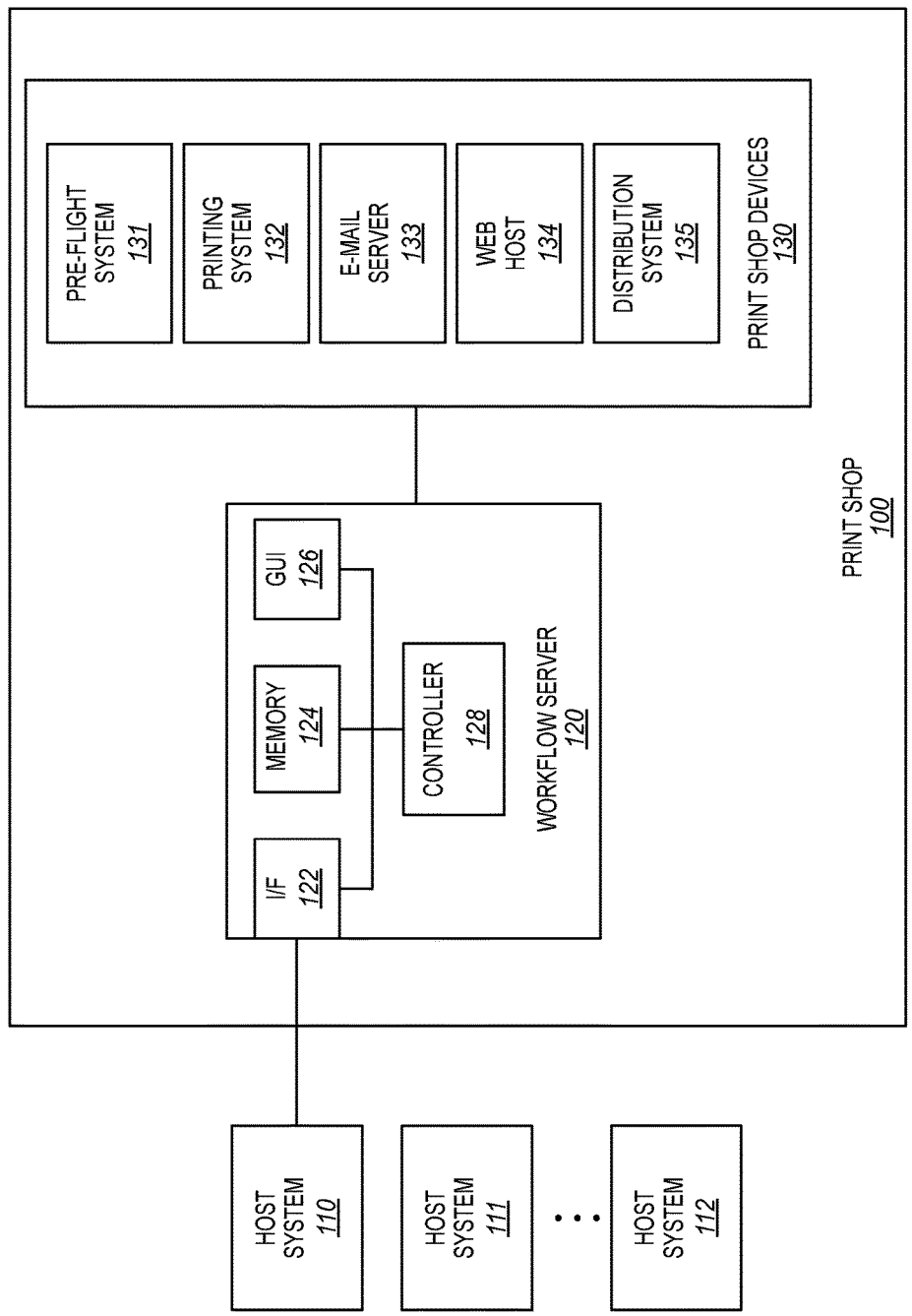
FIG. 1 is a block diagram illustrating a print shop in an exemplary embodiment.

FIG. 1 is a block diagram illustrating a print shop 100 in an exemplary embodiment. Print shop 100 includes a workflow server 120 that couples host systems 110-112 to print shop devices 130. Host systems 110-112 may include servers or software applications used by print shop customers having printing and document delivery needs (e.g., monthly bank statements, monthly credit card bills, etc.). In this example, print shop devices 130 include pre-flight system 131 to check for potential errors in the print data, printing system 132 for transforming print data onto a suitable printable medium (e.g., paper), email server 133 for generating e-mails, web host 134 for generating and hosting web pages or other internet content, and distribution system 135 for packaging and shipping printed documents, although other devices may be used.

Generally, workflow server 120 receives print jobs from host systems 110-112 and schedules the jobs for printing at one or more printers of printing system 132. A printer may include any printing device that is able to mark a printable media (e.g., mark a colorant to paper). One example of a printer is a continuous form production printer for high speed/high volume printing. The print jobs and/or print data streams generated by host systems 110-112 may include a variety of data formats. For instance, print data may be formatted as Page Description Language (PDL) print data, such as an Advanced Function Presentation (AFP) data stream, PostScript data, Printer Command Language (PCL) data, Portable Document Format (PDF) data, etc. The print job may also include, or be accompanied with, a job ticket. A job ticket is any data that defines how a print job is to be processed. For example, a job ticket may include attribute information for the type of media to use (e.g., A4, media bin, color, etc.), the size and/or formatting of pages on the media (e.g., duplex, N-up configurations, image/text alignment), the type of finishing, etc.

To prepare documents for printing and delivery, workflow server 120 may perform and/or direct various processing tasks on the print job prior to printing. For instance, workflow server 120 may send the print job to pre-flight system 131 for error checking before sending it to the printing system 132 for rasterization and printing. However, there is a possibility that a processing task performed on the print job prior to printing disrupts the intended output of the print job. That is, pre-flight system 131 (or another intervening workflow activity) may unexpectedly modify a print job by adding or deleting a logical page from the print job, thereby damaging the page sequence or the relationship of pages to front and back sheet prior to printing the print job. As a result, the wrong logical page (and printed customer information) may be included in a document/sheet and potentially cause print/delivery errors.

Consider, for example, an instance in which a billing entity generates a PDL print data stream that describes billing statements (e.g., documents) to be printed and mailed to customers. Each statement may include one or multiple logical pages having information that is of a sensitive nature (e.g., a social security number, account number, etc.) that a customer may not want distributed to a third party. Additionally, the PDL print data (or job ticket) may indicate that multiple logical pages are to be applied to opposing sheet sides of the printable medium (referred to as duplex or two-sided printing) and/or that multiple logical pages are to be applied to the same sheet side of the printable medium (referred to as N-up printing). Accordingly, workflow server 120 and/or printing system 132 may include a print controller operable to interpret, format, rasterize, or otherwise convert the PDL print data into a raster image of pixel such as a bitmap for output to a printer or to another display device (e.g., via email server 133). However, the PDL print data received/generated at workflow server 120 generally describes print data at a higher level than an output bitmap for the data. That is, each logical page may be described as a data object that contains text, graphics, images, and the controls or instructions for presenting the data. Thus, a data page object unexpectedly inserted or deleted prior to rasterization may cause a shift in logical pages in the PDL print data and cause printing system 132 to produce a sheet/statement which was intended for a different statement/customer in the original PDL print data.

Accordingly, workflow server 120 is enhanced to preserve the logical page order of a print job. As described in greater detail below, workflow server 120 may tag each logical page of a print job with self-identifying information prior to submitting the print job to any workflow activity that may potentially modify the print job, such as a pre-flight activity. After the workflow activity (e.g., pre-flight) is performed for the print job and/or before printing the print job, workflow server 120 may analyze the self-identifying information to check the page order before printing. The workflow server 120 thus assures that the logical pages are output in the intended, created order of the print job, despite any pre-flight or other workflow modifications which may have occurred.

Workflow server 120 may include an interface (I/F) 122 (e.g., an Ethernet interface, wireless interface, etc.) for receiving/transmitting print data for print jobs, memory 124 (e.g., Random Access Memory (RAM), a hard disk, etc.) for storing print jobs, a graphical user interface (GUI) 126 to enable a print shop operator or another user to review, create, and/or modify print jobs, and controller 128 for managing print jobs. Controller 128 may be implemented as custom circuitry, a processor executing programmed instructions, etc. The particular arrangement, number, and configuration of components described herein is exemplary and non-limiting. Illustrative details of the operation of workflow server 120 will be discussed with regard to FIG. 2 and FIG. 3.

Figure 2:
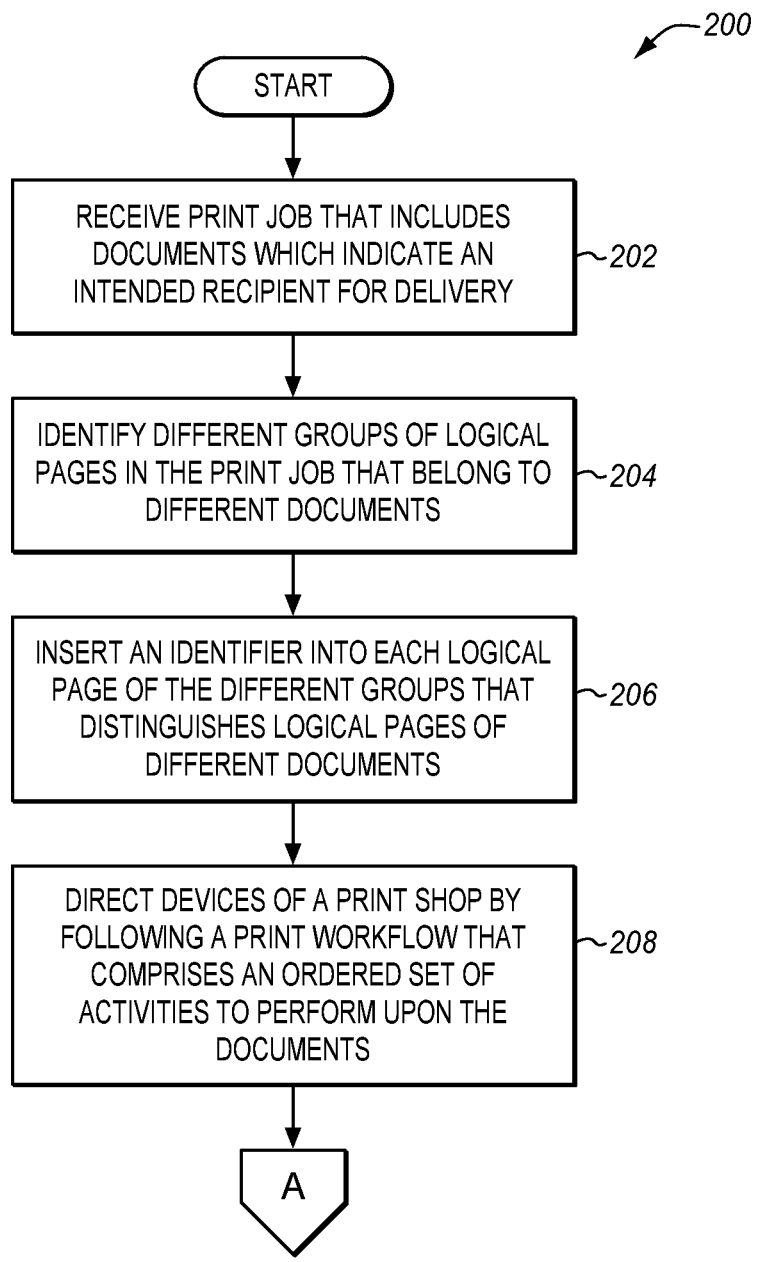
FIG. 2 is a flowchart illustrating a method for preserving logical page order in a print job in an exemplary embodiment.

FIG. 2 is a flowchart illustrating a method 200 for preserving logical page order in a print job in an exemplary embodiment. The steps of method 200 are described with reference to the print shop system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 122 receives a print job that includes multiple documents from host system 110-112. Each of the documents in the print job may be associated with an intended recipient for delivery. For example, a job ticket for the print job may identify a recipient for each document, or each document may include print data that identifies a recipient. As used herein, a "document" is an independent portion of a print job that is directed to a specific recipient for delivery (e.g., a single piece of mail). Thus, multiple documents may be defined in a single file of print data. Alternatively, a document may be considered an independent portion of a print job that does not require other portions of the print job in order to maintain its whole context or meaning. For example, an individual chapter of a book is not a document, because the chapter needs to be read along with the other chapters of the book in order to be fully understood. In contrast, in a print job with thousands of bank statements where each bank statement is intended for delivery to a different account holder, each bank statement is a complete document in and of itself.

In step 204, controller 128 identifies different groups of logical pages in the print job that belong to different documents. A document of the print job may include a group of one or more logical pages. That is, print data in the print job may describe multiple logical pages that indicate a common recipient or document (e.g., account number, recipient name, telephone number, etc.). Thus, controller 128 may analyze the print job to identify each document and to determine which logical pages belong to each document. For example, if the print job is a PDL print data stream, controller 128 may analyze the structure of the print data and identify tags or other markers that indicate a document object, page group object, and/or logical page object. In AFP, for instance, page groups are bounded by the Begin Named Page Group (BNG) and End Named Page Group (ENG) structured fields. Therefore, for an AFP print data stream, controller 128 may be configured to parse begin/end structured fields to identify a group of logical pages that belong to a document. Controller 128 may be configured to identify a type of print data format and analyze it for document page groups accordingly. For instance, for another print job format, controller 128 may use pointers in an index to identify groups of logical pages.

In step 206, controller 128 inserts an identifier into each logical page of the different groups that distinguishes logical pages of different documents. In doing so, controller 128 may generate a symbol or text that represents a document and modify each logical page of the document to include an identifier with that symbol/text. For example, controller 128 may modify the print job by inserting the identifier "group A" for all logical pages of a first document and inserting the identifier "group B" for all logical pages of a second document. Controller 128 may generate the identifier with symbols/text that denote a characteristic of a document such as customer information, a sequence of the document within a print data stream, a sequence of desired output/rasterization for the document as indicated in the print data or job ticket, etc.

In one embodiment, controller 128 generates an identifier that includes information that represents and/or identifies all logical pages of a document, and inserts the same identifier into each logical page of the group. Alternatively or additionally, controller 128 may generate an identifier that indicates a sequence of logical pages within a document, and insert different identifiers into each logical page of the group according to the sequence of pages in the document. Alternatively or additionally, controller 128 may generate/insert an identifier that indicates a front/back position of each logical page within a document. In doing so, controller 128 may reference print data or a job ticket that describes a placement (e.g., sequence and/or front/back side of a sheet) of each logical page. In AFP, for example, front/back placement may be indicated in a Form Definition (Formdef) object associated with a logical page. Controller 128 may thus process the Formdef object to determine whether a logical page is to be placed on a front or back of a sheet, and insert an identifier into the logical page that includes the front/back information. However, controller 128 may be operable with other print data formats with alternative indications for page placement and front/back positioning of the page onto a sheet.

In another embodiment, controller 128 inserts the identifier of a logical page as non-printable metadata. For instance, in AFP, page-level metadata follows the Active Environment Group (AEG) object. Thus, controller 128 may insert the identifier into a logical page as non-printable AFP metadata by modifying the metadata that follows the AEG object corresponding to the logical page. Alternatively, controller 128 may place or reference the identifier as contextual metadata for a logical page in a different manner corresponding with another print data format. For instance, metadata for a print job may be stored within an index, and controller 128 may insert metadata for a logical page by including index elements in an Extensible Markup Language (XML) format, such as the Extensible Metadata Platform (XMP) standard.

In step 208, controller 128 directs print shop devices 130 to process the print job by following a print workflow. The print workflow comprises an ordered set of print shop activities to perform upon the documents of the print job. That is, the activities defined in the workflow, when performed in order, enable workflow server 120 to manage print shop devices 130 and process the print job as desired. Each activity in a workflow may be associated with a category or type of print shop device (e.g., post-processing devices, printers, inserters) and may also be associated with specific named print shop devices. These activities may include printing or non-printing activities (e.g., billing, shipping, document review, multimedia/digital/internet activities, credit checks, etc.) as desired.

As described above, the possibility remains that one or more activities in defined in the print workflow may disrupt the originally intended page order of the print job. That is, intervening workflow steps performed and/or directed by workflow server 120 may re-arrange one or more logical pages of a print job. In method 200, controller 128 is configured to modify the print job such that each logical page is self-identifying for group and/or position. The self-identifying information moves with its logical page in the print workflow such that pages of different documents may be distinguished from one another subsequent to being processed through certain workflow activities. For instance, method 200 may be performed after workflow server 120 receives raw print data from host system 110-112 and before the print data is sent to pre-flight system 131 for error checking. Alternatively, controller 128 may be operable to perform one or more steps of method 200 as part of host system 110-112 or workflow server 120 that generates raw print data. As described in greater detail below, modifying print data according to method 200 enables document/page mismatches to be caught before printing.

Figure 3:
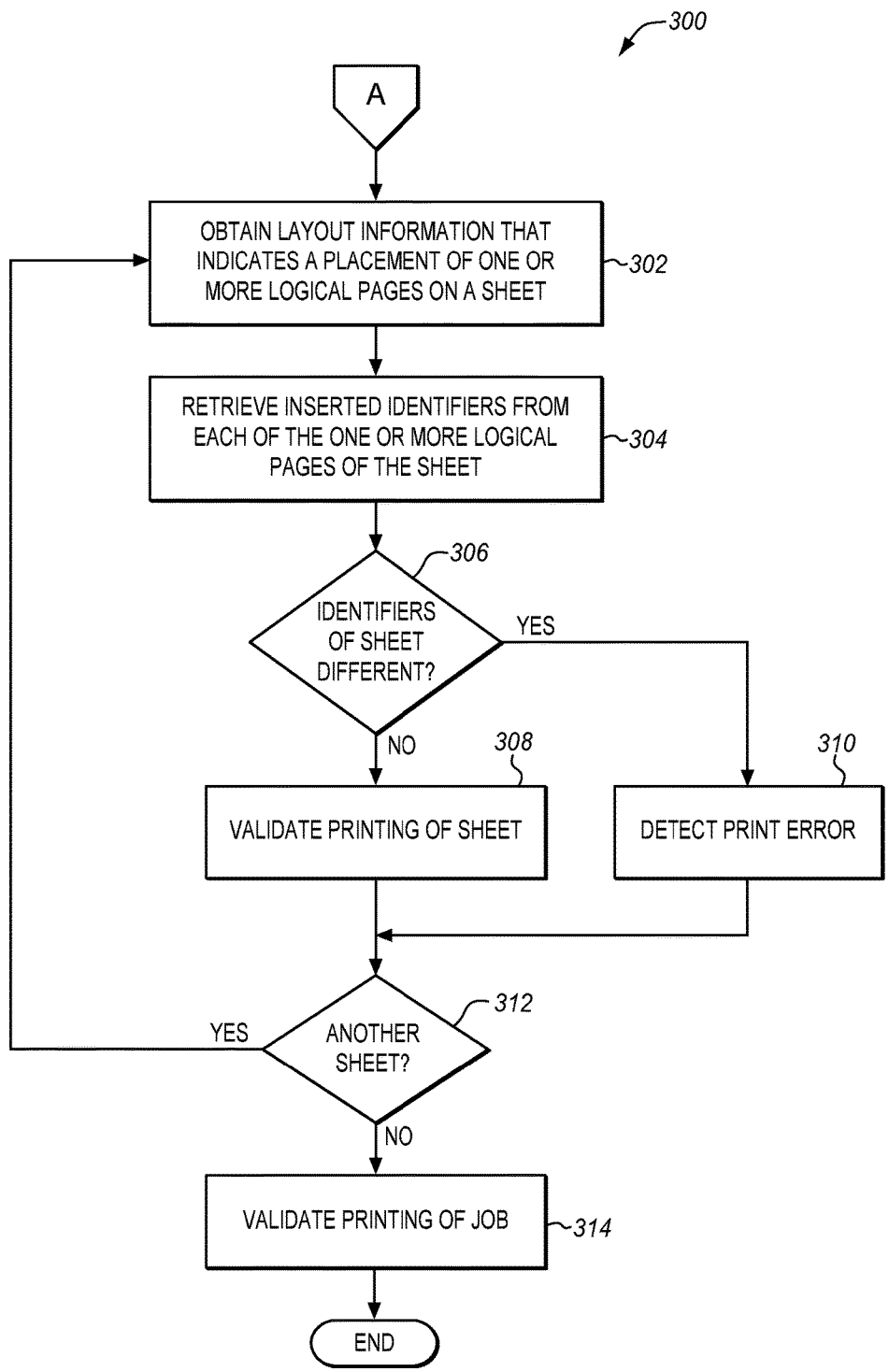
FIG. 3 is a flowchart illustrating a method for verifying the logical page order in a print job in an exemplary embodiment.

FIG. 3 is a flowchart illustrating a method 300 for verifying the logical page order in a print job in an exemplary embodiment. Assume, for method 300, that logical pages of the print job have been modified to include the self-identifying group and/or position information discussed with respect to method 200. Further assume that method 300 is initiated at some point in time after method 200. That is, method 300 may be initiated as an error analysis process prior to submitting the print job (or a particular sheet thereof) to printing system 132 (or a particular print server, print controller, or printer associated with printing system 132). Alternatively or additionally, method 300 may be performed on one or more logical pages that have been processed through a potentially job modifying workflow activity such as pre-flight system 131 or another processing task performed/directed by workflow server 120. The steps of method 300 are described with reference to the print shop system 100 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, controller 128 obtains layout information that indicates a placement of one or more logical pages on a sheet. Controller 128 may perform or direct a process which generates a virtual layout that maps one or more logical pages to a sheet side in accordance with a plex and/or N-up format requested in the print data or job ticket. For instance, controller 128 may communicate with or operate as part of printing system 132 to retrieve layout information for a sheet in the process of interpreting, formatting, and/or rasterizing logical pages into bitmaps placed on a sheet side for a printer.

In step 304, controller 128 retrieves identifiers from each of the one or more logical pages of a sheet. That is, controller 128 may read the identifier from each logical page that belongs to a sheet according to the virtual layout determined in step 302. Controller 128 may obtain identifiers of logical pages according to the format of the print data and/or the insertion technique corresponding with step 206 of method 200. For instance, in AFP, controller 128 may parse the metadata that follows the AEG objects corresponding to each logical page to be placed on a sheet to collect inserted identifiers for the sheet.

In step 306, controller 128 determines whether the identifiers retrieved for the sheet are different from one another. If the identifiers match, method 300 may proceed to step 312 where controller 128 validates the sheet for printing. Otherwise, method 300 proceeds to step 310 where controller 128 detects a print error. Since step 206 of method 200 may create different identifiers for each logical pages of a different document, controller 128 may subsequently detect an error when two or more logical pages placed on the same sheet have different identifiers. That is, controller 128 may analyze/compare identifiers for each logical page included on the sheet and determine that a logical page has been pushed into the wrong document based on a mismatch of at least one identifier on the sheet with another identifier on the sheet.

Alternatively or additionally, in embodiments in which the identifier inserted into each logical page indicates a sequence of logical pages within a group of pages (or document), controller 128 may detect a print error in step 310 in response to a determination that the sequence of the identifiers retrieved for the sheet do not match an order of the placement indicated in the layout information of the sheet. Alternatively or additionally, in embodiments in which the identifier inserted into each logical page indicates a front/back position of each logical page within a group of pages (or document), controller 128 may detect a print error in step 310 in response to a determination that at least one of the inserted identifiers retrieved for the sheet indicates a front/back position that is different than a side of the sheet indicated in the layout information.

Controller 128 may therefore ensure that the position and/or placement of each logical page in the print job is correct before the sheet or print job is output at printing system 132. Thus, controller 128 may detect potential print errors before they occur at printing system 132 without sensors, scanning equipment, etc. In an alternative embodiment, controller 128 may insert identifiers as printable data to be printed in an outside margin (e.g., a trim area) so that it may retrieve identifiers using scanning equipment prior to removal of the printed identifiers from a sheet. In some embodiments, controller 128 may perform additional activities in response to detecting the print error. For instance, controller 128 may suspend printing of the print job, stop submitting print data stream to printing system 132, generate an alert that display a warning on GUI 126 that identifies the print error and/or associated sheet/pages, and/or receive user input (and/or corrective action) via GUI 126 before resuming the print job.

In step 312, controller 128 determines whether there are additional sheets in the print job. If so, method 300 may repeat steps 302-312 for each additional sheet in the print job. Thus, controller 128 may collect page-level metadata for each sheet that indicates grouping, ordering, and/or front/back positioning for each logical page that belongs to the sheet. Controller 128 may compare the inserted metadata for a group of logical pages with a virtual layout placement of those logical pages for sheet-by-sheet validation of the print job. That is, controller 128 may use the metadata to validate the group and/or position of the sheet before submitting the sheet to printing system 132 and/or allowing printing the sheet at printing system 132. Otherwise, if there are no additional sheets in the print job (and/or remaining outstanding print errors), controller 128 may validate the print job for printing at step 314. That is, if there are no outstanding printer errors and no remaining sheets in the print job, controller 128 may proceed processing of the print job through the workflow for printing/delivery and/or confirm (e.g., via GUI 126) that there is no risk of a print error resulting from commingling pages that belong to different documents in the print job.

In method 300, logical page mismatches may be caught quickly prior to printing and/or as part of the process of formatting, rasterizing, and/or printing those logical pages at printing system 132. Because controller 128 may operate independently or within each of host systems 110-112, workflow server 120, and printing system 132, many possibilities exist for controller 128 to identify problems that may arise as a print data stream is generated, processed, and/or printed by print shop 100. This may ensure that sensitive information in a print data stream cannot be printed/mailed outside of its originally intended document.

EXAMPLES

Figure 4:
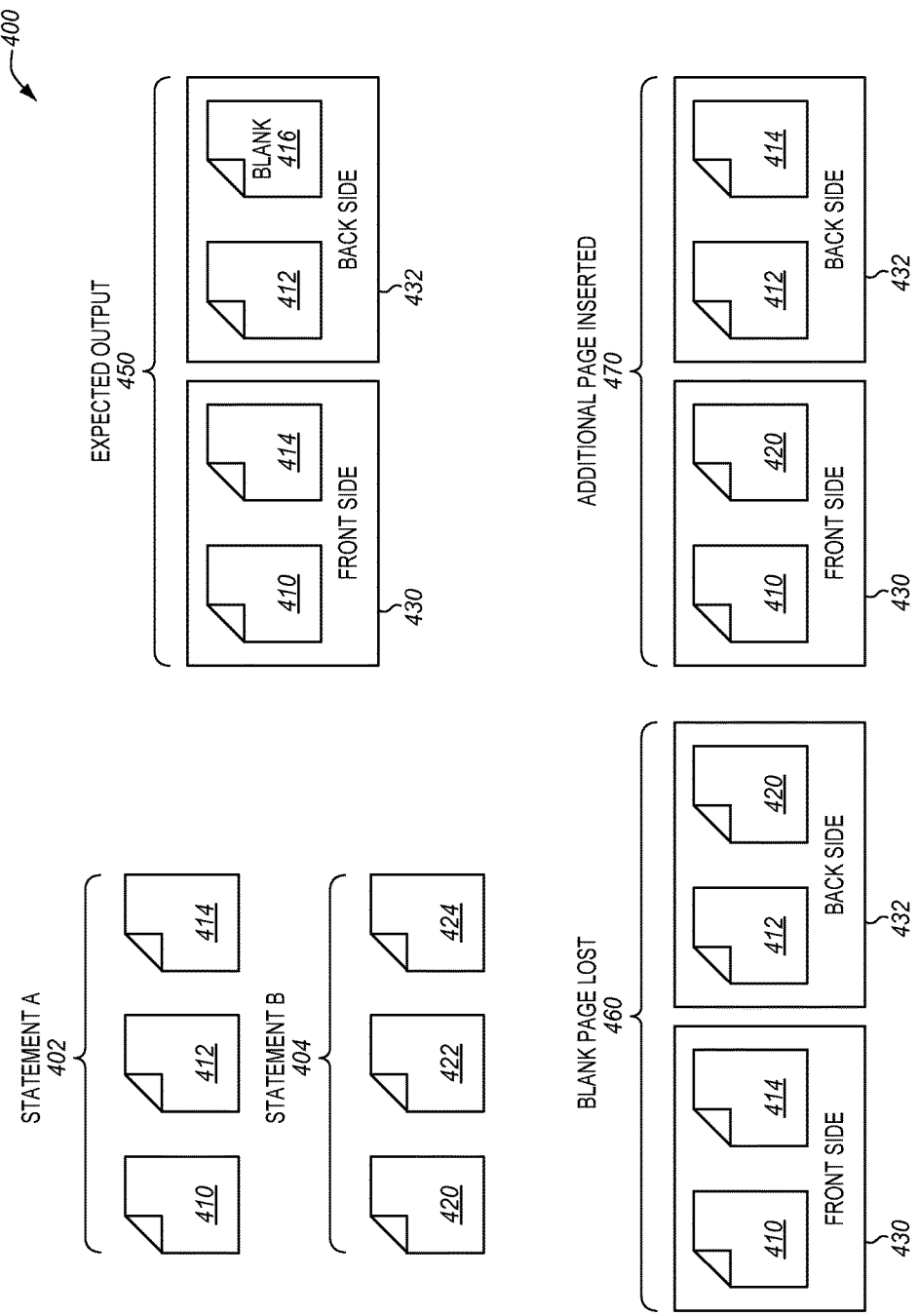
FIG. 4 is a diagram illustrating statements and potential printed outputs of AFP print data in an exemplary embodiment.

In the following examples, additional processes, systems, and methods are described in the context of preserving logical page order for AFP print jobs. FIG. 4 is a diagram 400 illustrating statements 402/404 and potential printed outputs 450/460/470 of AFP print data in an exemplary embodiment. Assume, for this example, that the AFP print data received/generated at workflow server 120 includes Statement A 402 and Statement B 404. Controller 128 may analyze the print data to identify Statement A 402 and Statement B 404 as AFP documents and may further analyze each AFP document to determine that Statement A 402 includes three logical pages 410, 412, and 414 and that Statement B 404 includes three logical pages 420, 422, and 424.

Further assume for this example that the AFP print data is configured to be produced at printing system 132 according to an expected output 450. In the expected output 450, the AFP print data is printed in a 2-up format wherein the front side 430 of a sheet includes logical pages 410/414 and the back side 432 of the sheet includes logical page 412 and a blank page 416.

However, workflow server 120 may inadvertently modify the AFP print data. In one example, the workflow server 120 may remove an IMM in the AFP print data such that the blank page 416 is missing or lost. In prior systems, the printed output may result in a blank page lost 460 wherein the front side 430 of a sheet correctly includes logical pages 410/414 but the back side 432 of the sheet includes logical page 412 and logical page 420 which belongs to Statement B 404. Without appropriate correction, the sheetsides 430/432 may be printed/mailed to a customer of Statement A 402 with private information from another customer of Statement B 404 included.

In another example, workflow server 120 may insert a page in the AFP print data, potentially resulting in a printed output with an additional page inserted 470 where the front side 430 includes logical page 410 and logical page 420 which belongs to Statement B 404. Thus, a page from the wrong document has been pushed into the wrong group in this scenario as well. Additionally, the back side 432 of the sheet includes logical page 414 instead of the blank page 416, and the logical page 414 was intended to be on the front side 430 of the sheet. Thus, without appropriate correction, the sheetsides 430/432 may be printed/mailed to a customer of Statement A 402 with private information from another customer of Statement B 404 included and the information of Statement A 402 may be printed out of order.

Figure 5:
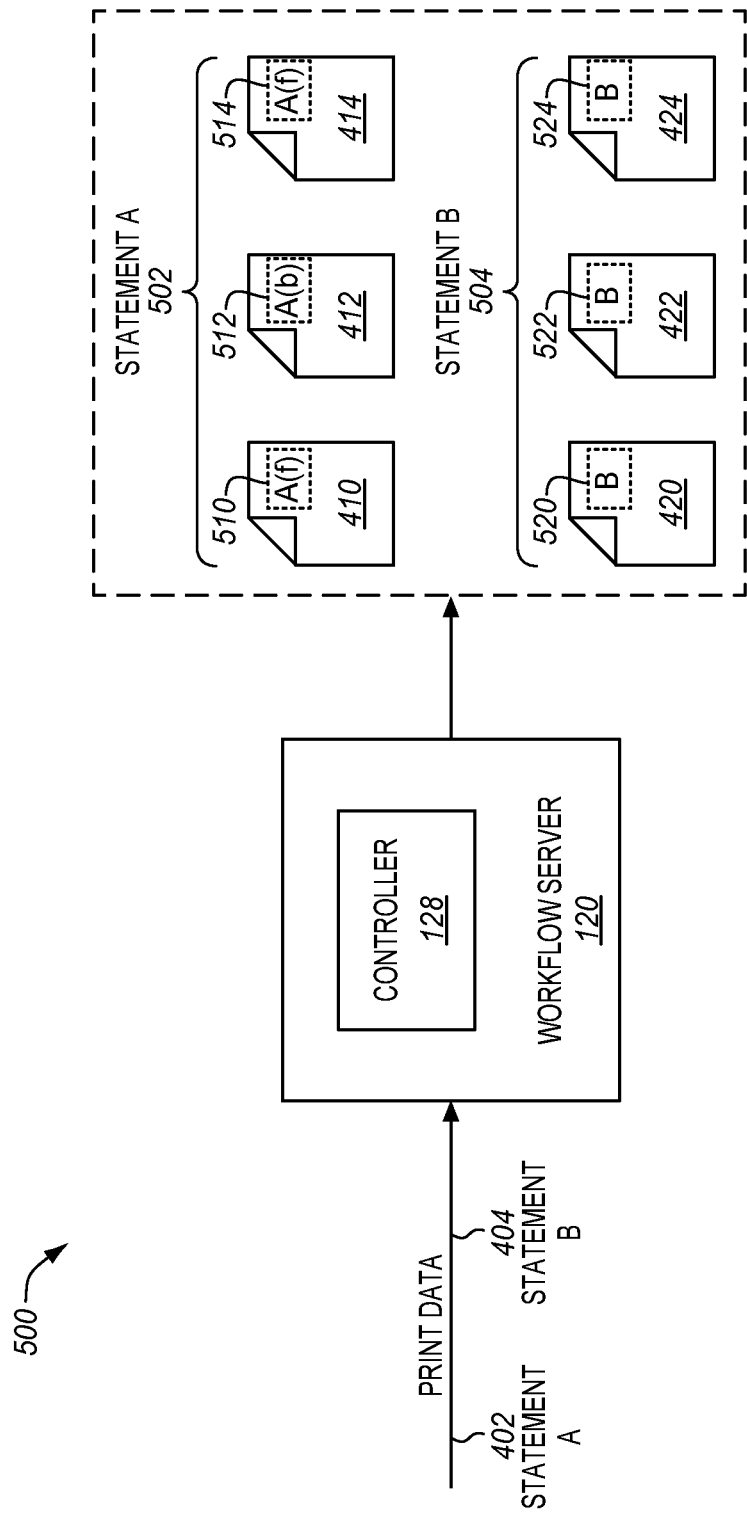
FIG. 5 is a diagram illustrating tagged print data in an exemplary embodiment.

To remedy these problems, controller 128 tags Statement A 402 and Statement B 404 with metadata. FIG. 5 is a diagram 500 illustrating tagged AFP print data in an exemplary embodiment. For each logical page 410-414 in Statement A 402, controller 128 stores non-printable metadata 510-514 showing page group (e.g., "A") and front/back positioning (e.g., "(f)" for front or "(b)" for back), resulting in Statement A as shown in element 502. For each logical page 420-424 in Statement B 404, controller 128 stores non-printable metadata 520-524 showing page group (front/back positioning not shown), resulting in statement B as shown in element 504. Thus, each logical page in the AFP print data is self-identifying for group and/or position.

The metadata allows controller 128 to catch the blank page lost 460 and/or the additional page inserted 470 described above. More particularly, in the blank page lost 460 scenario, controller 128 may warn of a group position error by determining that the group identifier in metadata 512 of logical page 412 (e.g., "A") and the group identifier in metadata 520 of logical page 420 (e.g., "B") are different but have been placed together on the back side 432 of the sheet. Similarly, in the additional page inserted 470 scenario, controller 128 may warn of a group position error by determining that the group identifier in metadata 510 of logical page 410 (e.g., "A") and the group identifier in metadata 520 of logical page 420 (e.g., "B") are different but have been placed together on the front side 430 of the sheet. Also, controller 128 may warn of a sheet position error by determining that the indicator in metadata 514 of logical page 414 indicates a front sheet side (e.g., "(f)") but has instead been placed on the back side 432 of the sheet.

Figure 6:
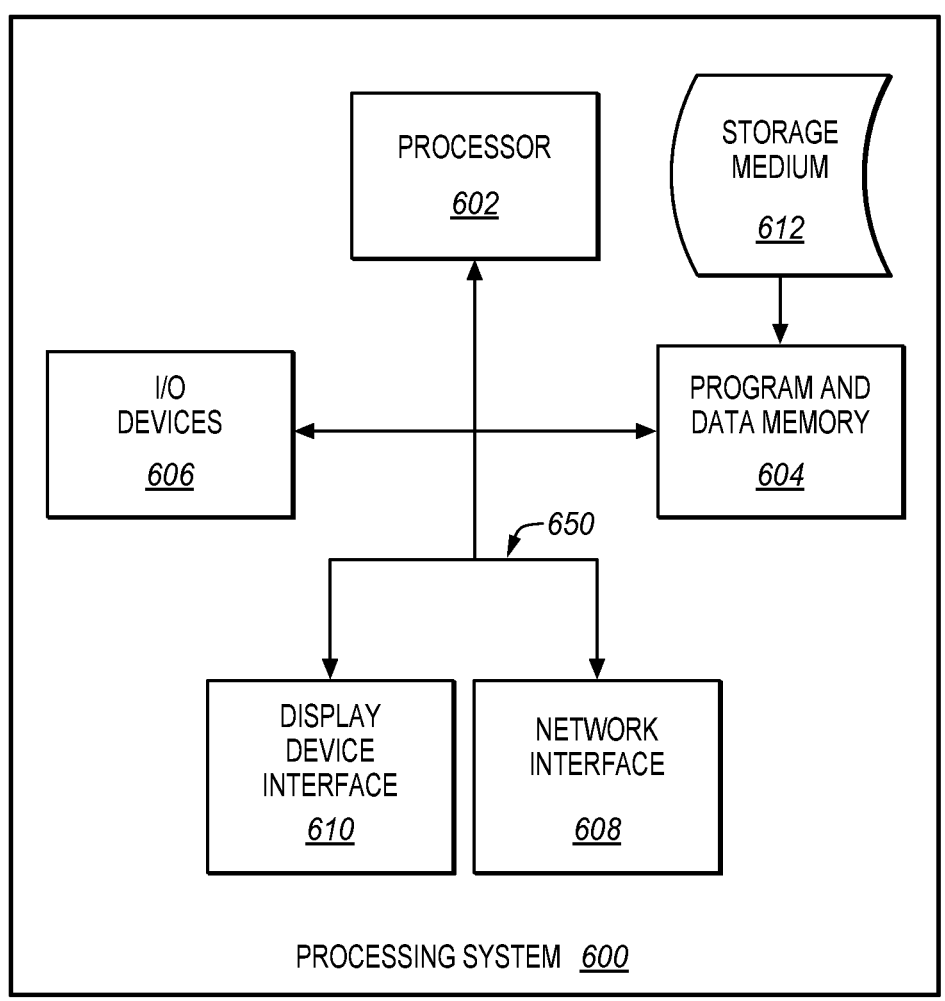
FIG. 6 illustrates a processing system operable to execute a computer readable medium embodying programmed instructions to perform desired functions in an exemplary embodiment.

Controller 128 and related components such as workflow server 120, pre-flight system 131, printing system 132, etc. may perform the operations and functions described herein by executing one or more sequences of instructions stored on a machine/computer readable medium. Embodiments disclosed herein can take the form of software, hardware, firmware, or various combinations thereof. FIG. 6 illustrates a processing system 600 operable to execute a computer readable medium embodying programmed instructions to perform desired functions in an exemplary embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Processor 602 may include any electronic circuits and/or optical circuits that are able to perform functions. For example, processor 502 may be communicatively coupled with components of print shop system 100 and perform any functionality described herein for computer 110 and/or workflow server 130. Processor 602 may include one or more Central Processing Units (CPU), microprocessors, Digital Signal Processors (DSPs), Application-specific Integrated Circuits (ASICs), Programmable Logic Devices (PLD), control circuitry, etc.

Program and data memory 604 can include local memory employed during actual execution of the program code, bulk storage, and cache memories that provide temporary storage of at least some program code and/or data in order to reduce the number of times the code and/or data are retrieved from bulk storage during execution. Program and data memory 604 may be implemented on workflow server 120, host system 110-112 and/or print shop devices 130 and may include any electronic circuits, optical circuits, and/or magnetic circuits that are able to store data, such as one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof.

What is claimed is:

1. A system comprising:
    an interface configured to receive a print job that defines documents for delivery; and
    a controller configured to identify different groups of logical pages in the print job that belong to different documents, to insert an identifier into each logical page of the different groups that distinguishes logical pages of different documents, and to direct the print job into a print workflow that comprises an ordered set of activities to perform upon the documents;
    the controller further configured to obtain layout information that indicates a placement of one or more logical pages on a sheet, to retrieve identifiers from each of the one or more logical pages of the sheet, and to detect a print error in response to a determination that at least one of the identifiers retrieved for the sheet identifies a different document than another one of the identifiers retrieved for the sheet.

2. The system of claim 1, wherein:
the identifiers indicate a sequence of logical pages within a group of logical pages; and
the controller is further configured to detect the print error in response to a determination that the sequence of the identifiers retrieved for the sheet do not match an order of the placement indicated in the layout information of the sheet.

3. The system of claim 1, wherein:
the identifiers indicate a front/back position of each logical page within a group of logical pages; and
the controller is further configured to detect the print error in response to a determination that at least one of the identifiers retrieved for the sheet indicates a front/back position that is different from a side of the sheet indicated in the layout information.

4. The system of claim 1, wherein:
the controller is further configured to insert the identifier into each logical page of the different groups by modifying an object of a Page Description Language (PDL) data stream corresponding to each logical page.

5. The system of claim 1, wherein:
the controller is further configured to insert the identifier into each logical page of the different groups by modifying an object that describes non-printable metadata for each logical page.

6. The system of claim 1, wherein:
at least one of the activities in the print workflow is a pre-flighting process for the print job;
the controller is further configured, before the pre-flighting of the print job, to insert the identifier into each logical page of the different groups that distinguishes logical pages of different documents; and
the controller is further configured, after the pre-flighting of the print job, to obtain the layout information, retrieve the identifiers, and to detect the print error with the layout information and the identifiers.

7. The system of claim 1, wherein:
the controller is further configured to insert the identifier into each logical page of the different groups after creation of the print job, wherein the print job is created according to an Advanced Function Presentation (AFP) format, and wherein the identifiers are into metadata objects following an Active Environment Group (AEG) of each logical page of the print job; and
the controller is further configured to retrieve metadata information for all logical pages of the sheet, and to detect the print error based on the metadata information retrieved for the sheet before printing of the sheet has initiated.

8. A method comprising:
receiving a print job that defines documents for delivery;
identifying different groups of logical pages in the print job that belong to different documents;
inserting an identifier into each logical page of the different groups that distinguishes logical pages of different documents;
directing the print job into a print workflow that comprises an ordered set of activities to perform upon the documents;
obtaining layout information that indicates a placement of one or more logical pages on a sheet;
retrieving identifiers from each of the one or more logical pages of the sheet; and
detecting a print error in response to a determination that at least one of the identifiers retrieved for the sheet identifies a different document than another one of the identifiers retrieved for the sheet.

9. The method of claim 8 wherein:
the identifiers indicate a sequence of logical pages within a group of logical pages; and
the method further comprises:
detecting the print error in response to a determination that the sequence of the identifiers retrieved for the sheet do not match an order of the placement indicated in the layout information of the sheet.

10. The method of claim 8 wherein:
the identifiers indicate a front/back position of each logical page within a group of logical pages; and
the method further comprises:
detecting the print error in response to a determination that at least one of the identifiers retrieved for the sheet indicates a front/back position that is different from a side of the sheet indicated in the layout information.

11. The method of claim 8 further comprising:
inserting the identifier into each logical page of the different groups by modifying an object of a Page Description Language (PDL) data stream corresponding to each logical page.

12. The method of claim 8 further comprising:
inserting the identifier into each logical page of the different groups by modifying an object that describes non-printable metadata for each logical page.

13. The method of claim 8 wherein:
at least one of the activities in the print workflow is a pre-flighting process for the print job; and
the method further comprises:
before the pre-flighting of the print job:
inserting the identifier into each logical page of the different groups that distinguishes logical pages of different documents; and
after the pre-flighting of the print job:
obtaining the layout information;
retrieving the identifiers; and
detecting the print error with the layout information and the identifiers.

14. A non-transitory computer readable medium embodying programmed instructions which, when executed by a processor, are operable for performing a method comprising:
receiving a print job that defines documents for delivery;
identifying different groups of logical pages in the print job that belong to different documents;
inserting an identifier into each logical page of the different groups that distinguishes logical pages of different documents;
directing the print job into a print workflow that comprises an ordered set of activities to perform upon the documents;
obtaining layout information that indicates a placement of one or more logical pages on a sheet;
retrieving identifiers from each of the one or more logical pages of the sheet; and
detecting a print error in response to a determination that at least one of the identifiers retrieved for the sheet identifies a different document than another one of the identifiers retrieved for the sheet.

15. The medium of claim 14, wherein:

the identifiers indicate a sequence of logical pages within a group of logical pages; and the method further comprises:

detecting the print error in response to a determination that the sequence of the identifiers retrieved for the sheet do not match an order of the placement indicated in the layout information of the sheet.

16. The medium of claim 14, wherein:

the identifiers indicate a front/back position of each logical page within a group of logical pages; and the method further comprises:

detecting the print error in response to a determination that at least one of the identifiers retrieved for the sheet indicates a front/back position that is different from a side of the sheet indicated in the layout information.

17. The medium of claim 14, wherein the method further comprises:

inserting the identifier into each logical page of the different groups by modifying an object of a Page Description Language (PDL) data stream corresponding to each logical page.

18. The medium of claim 14, wherein the method further comprises:

inserting the identifier into each logical page of the different groups by modifying an object that describes non-printable metadata for each logical page.

19. The medium of claim 14, wherein:

at least one of the activities in the print workflow is a pre-flighting process for the print job; and the method further comprises:

before the pre-flighting of the print job:

inserting the identifier into each logical page of the different groups that distinguishes logical pages of different documents; and after the pre-flighting of the print job:

obtaining the layout information;

retrieving the identifiers; and detecting the print error with the layout information and the identifiers.

20. The medium of claim 14, wherein the method further comprises:

inserting the identifier into each logical page of the different groups after creation of the print job, wherein the print job is created according to an Advanced Function Presentation (AFP) format, and wherein the identifiers are into metadata objects following an Active Environment Group (AEG) of each logical page of the print job; and retrieving metadata information for all logical pages of the sheet; and detecting the print error based on the metadata information retrieved for the sheet before printing of the sheet has initiated.

* * * * *